Aug. 18, 1942.  C. E. MORLEY  2,293,303
ADJUSTABLE SUPPORT
Filed Dec. 23, 1940  2 Sheets-Sheet 1
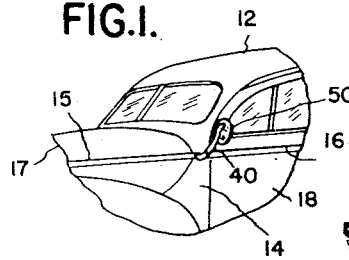
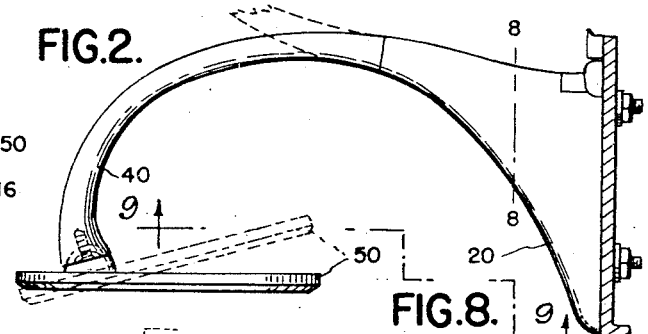
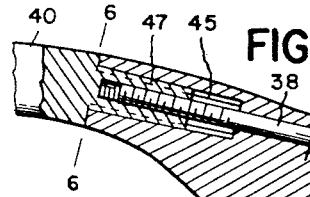
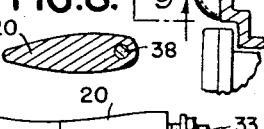
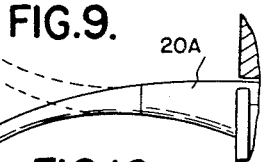
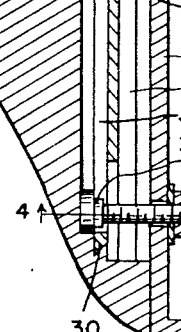
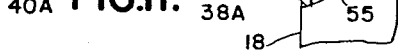
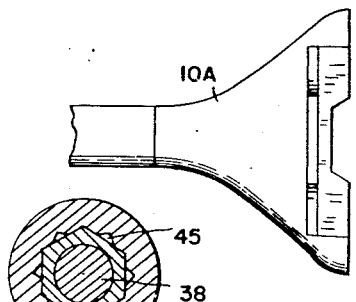
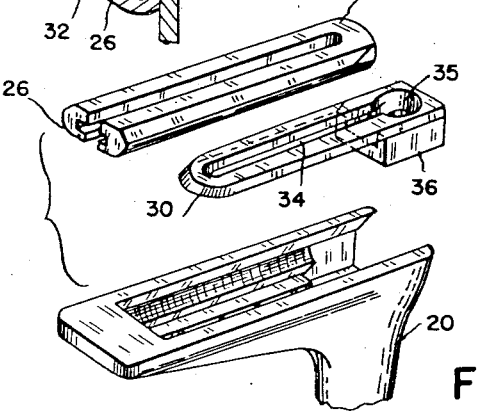
INVENTOR.
CHARLES E. MORLEY
BY
ATTORNEYS Aug. 18, 1942.   C. E. MORLEY   2,293,303
ADJUSTABLE SUPPORT
Filed Dec. 23, 1940   2 Sheets-Sheet 2
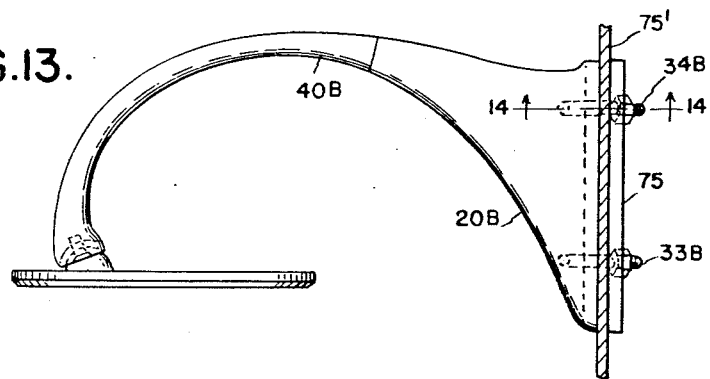
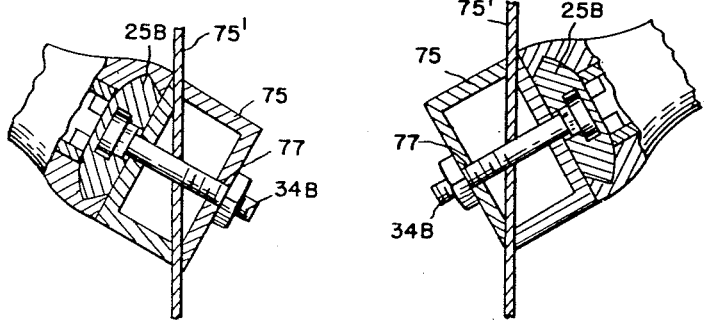
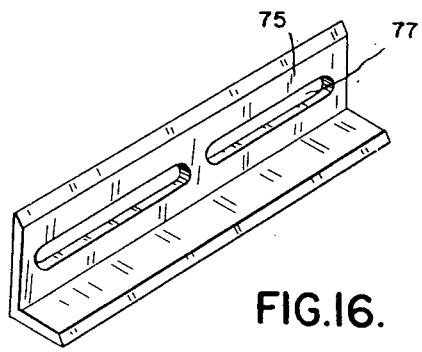
INVENTOR.
CHARLES E. MORLEY
BY
ATTORNEYS Patented Aug. 18, 1942

BEST AVAILABLE COPY 2,293,303

UNITED STATES PATENT OFFICE 2,293,303

ADJUSTABLE SUPPORT

Charles E. Morley, Grosse Pointe, Mich.

Application December 23, 1940, Serial No. 371,325

10 Claims. (Cl. 248—203)

This invention relates to adjustable supporting means, particularly for rear view mirrors such as are used upon motor cars, and aims generally to provide a construction constituting an improvement upon that disclosed in my previously issued Patent, No. 2,212,033, granted August 20, 1940.

An important object of the invention is to provide an improved adjustable mirror support adapted to be attached to the exterior of a motor vehicle, in a position conveniently within the line of vision of the driver, the support comprising an arm so constructed that its parts may be rearranged to change its effective shape, not only to permit a wider range of adjustment of the mirror, but to permit identical arm constructions to be used upon opposite sides of the car, to support right-hand and left-hand mirrors, thus eliminating the necessity for providing special right-hand and left-hand arms, as is now necessary, despite which the invention provides a supporting arm of finished appearance and rigid character. By virtue of the adaptability of my improved arm construction to both right hand and left hand use, it becomes unnecessary for the manufacturer to provide duplicate tools, dies and manufacturing facilities, such as are now required, and unnecessary for the jobbing and selling agencies to provide, as they now must, for the duplication of inventories, and duplication of handling and bookkeeping facilities. Great expense is thereby saved.

Another important object of the invention is to provide improved mirror supporting means of novel construction and extremely attractive appearance, having a base portion adapted to replace a section of the garnish or trim molding of the vehicle, so that the mirror when installed blends harmoniously with the design and ornamental parts of the vehicle.

A related object is to provide such an improved mirror supporting arm construction adapted to replace that section of the garnish or trim molding, of relatively short length, which is secured to the side of the cowl of the vehicle, the construction of the arm being such that its base portion which lies against the vehicle, is adjustable in length, so that it may be made to correspond to the varying cowl lengths of different makes and models of cars, and so is universally applicable to virtually all motor cars, yet presents when installed the appearance of a custom-made accessory constructed especially for the make and model of car to which it is applied.

Further objects comprise the provision of an improved mirror of the class described which is virtually theft-proof when applied to the car, and which, despite the adjustability of its component parts, presents an extremely neat and finished appearance.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a fragmentary perspective view of an automobile body, showing one of my improved mirror constructions applied thereto.

Figure 2 is a plan view of the mirror construction from above, showing adjacent portions of the vehicle body in horizontal section.

Figure 3 is a horizontal section of the supporting portions of the mirror, and adjacent parts of the vehicle body.

Figures 4, 5 and 6 are cross sections taken substantially on the lines 4—4 and 5—5 and 6—6 respectively of Figure 3, and looking in the direction of the arrows.

Figure 7 is an exploded perspective view showing the more important parts of the base separated from one another.

Figure 8 is a cross section taken substantially on the line 8—8 of Figure 2 and looking in the direction of the arrows.

Figure 9 is a side view of my improved mirror support with the outer end broken away, looking in the direction of the line and arrows 9—9 of Figure 2 and drawn to a smaller scale.

Figure 10 is a plan view similar to Figure 2 showing a mirror having a modified securing portion constructed for attachment to the door rather than to the cowl of the vehicle.

Figure 11 is a horizontal section thereof corresponding to Figure 3.

Figure 12 is a side view of the arm, taken as indicated by the line and arrows 12—12 of Figure 11, but with the retaining clip and adjacent portions removed.

Figure 13 is a horizontal sectional plan view similar to Figure 2 but showing another somewhat modified support construction.

Figure 14 is a vertical section taken substantially on the line 14—14 of Figure 13.

Figure 15 is a vertical section similar to Figure 14 but showing the supporting means reversed and arranged to support a mirror on the opposite side of the car in a symmetrically opposite arrangement.

Figure 16 is a perspective view of one of the filler elements used in the modified construction.

Referring now to the drawings: reference character 12 designates generally a closed automobile body, illustrated as having a cowl 14; garnish molding strip portions 15, 16 being illustrated as extending along the sides of the hood 17 and door 18 respectively. Such strip is ordinarily formed of rolled or extruded sheet metal, chrome plated or otherwise provided with an ornamental finish. A continuing section is ordinarily applied to the side of the cowl between the hood and the door, to give the appearance of a continuous strip, although such short section (not shown) is removed, in installing my improved mirror, the base portion 20 of which corresponds in length and width to the replaced garnish molding.

The replaced garnish molding section is ordinarily held in place by clips (unshown) which extend through suitable apertures as 21 in the side of the cowl.

In the construction disclosed in my previous patent, above referred to, the mirror base is provided with threaded nuts, spaced conformably to the spacing of the apertures 21, and adapted to be projected therethrough, so that the mirror may be held in place upon the side of the cowl by means of nuts screwed upon the studs inside of the vehicle. With such construction, the mirror base must correspond in length to the replaced garnish molding section, if the appearance of a continuous molding is to be preserved, and it is accordingly necessary to manufacture a special base for each make and model of vehicle upon which the mirror is to be installed, although previous to the disclosure of my aforesaid patent it was necessary to manufacture not only a special base, but a complete mirror support assembly, for each such make and model of car. The previous disclosure will be seen to represent a further advance in the art in this connection, in that the base construction itself is adjustable, to fit all makes and models of cars, so that no special parts or manufacturing processes are required at all. To this end, both the length of the base itself and the positioning of its holding studs are variable, to compensate for the differences in the length of the molding section and the positioning of the clip holes, in the different motor cars.

The length of the base section 20 is made to correspond to the length of the cowl molding employed upon the car having the shortest such cowl molding to which the mirror is to be applied. An extension molding section 25 is slidable in a conformably shaped slideway 26 in the base 20, the shape of such slideway and molding, as best shown in Figures 4 and 5, being such as to impart a crowned contour to the extension molding, the base and molding being retained against separation by virtue of the dove-tailed or undercut cross section of the interfitted parts. A second undercut slideway is formed in the base by a slotted plate 30 fitted thereinto beneath the slideway 26 for the extension molding section 25. The arm 20 may be diecast, but plate 30 is preferably formed of tougher material, and chamfered along its edges, to interlock with and be retained by the metal of the base, being slipped thereinto from the front end of the arm and locked in place by the screw 38. Beneath the plate 30 an enlarged opening 32 is formed for the head of the stud bolt 33, the stem of which extends through the narrower slot 34 in the plate. At one end the slot 34 is enlarged, as at 35, to permit insertion of the head of the stud bolt, this end of the plate being enlarged and thickened, as at 36, and apertured to receive the screw 38 by which the mirror supporting arm 40 is attached to the base section 20.

The extension molding section 25 is also provided with an undercut slot 26 open at its inner end and adapted to receive a similar stud bolt 43, the end of which is in like fashion movable along the slot, so that the position of this bolt may be adjusted independently of the degree of extension of the molding section 25. Each of the stud bolts will be seen to be provided with a flattened section $34^2$, $44^2$ adapted to slide in the narrower portion of its slot and so key the bolt against turning.

When the bolt 33 is loose, the extension 25 may be slid in and out of the base to adjust the total length of the base and extension assembly to conform to the length of the replaced garnish molding. This is the first step in installing the mirror. Thereafter the bolts 33—43 are moved to positions corresponding to the spacing of the holes 21. The bolts are then projected through the body sheathing, 14, and the nuts, as 34', 44', are applied to the stems of the bolts, inside the body, and tightened. The extension section 25 and body 20 are thereby clamped against movement with relation to each other as well as with relation to the vehicle body.

The outwardly projecting portion of the base 20 terminates in a circular face having a re-entrant polygonal socket 45 concentric with the face and with the screw 38, which projects into the socket from the bottom. The arm portion 40, which carries the mirror 50 at its outer end, is also circular at its inner end and of the same diameter as the outer face of the base. The arm is also provided at its inner end with a polygonal stem 47 concentric therewith and adapted to fit into the socket 45. Stem 47 is centrally tapped to receive the screw 38, which when tightened secures the arm 40 to the base 20, the proportions of these parts in side elevation being such that they present smooth contours and appear as a continuous and unbroken structure, as best shown in Figures 2, 3 and 9. In the shown construction the stem 47 is hexagonal, and the socket 45 is shaped to receive it but provided with twelve portions so pointed in cross section as to receive the stem in any of twelve corresponding angular positions. It will thus be seen that by loosening the screw 38, the arm 40 may be removed, to separate the stem 47 from the socket 45, whereafter the arm 40 may be turned at any desired position within its range of adjustment, in the thirty degree steps permitted by the socket, and thereafter fastened rigidly in place. Since the arm 40 is curved to project upwardly and position the mirror higher than the garnish molding, it will be apparent that the ability to turn the arm 40 with respect to the base permits turning the arm to the proper upward curvature regardless of whether the assembly is installed on the right-hand or the left-hand side of the vehicle. The base portion 20 projects out perpendicularly from the inner face of the base, the upward curvature being incorporated entirely in the arm portion 40. The mirror 50 is attached to the arm 40 for limited universal adjustment, as best shown in Figure 2, and a wider range of adjustment is of course also possible by loosening the screw 38 and turning the arm 40 in the manner described.

In the modified construction shown in Figures 10, 11 and 12, the base 20a is adapted to be attached to the peripheral flange 50 of the door 18 of the vehicle, as by means of a sheet metal clip 51, of substantially U-section, adapted to project around and behind the flange 50, between such flange and the adjacent body or cowl portion 14. A set screw 53, carried by that portion of the clip which underlies the flange, is adapted to clamp the latter to retain the mirror support in place, as best shown in Figure 11. The base 20A and clip 51 are provided with registering apertures (undesignated) through which a holding screw 38A is adapted to project, the head of such screw being concealed in a recess 55 beneath the inner end of the arm, and accordingly inaccessible when the mirror is in place. The screw 38A projects into the polygonal socket 45A which is adapted to receive the polygonal stem 47A of the mirror supporting arm 40A, the latter being thus adjustable and adapted to be turned with respect to the base 20A whenever the screw 38A is loosened to permit such turning, as in the embodiment previously described.

The embodiment shown in Figures 13-16 inclusive corresponds more closely to that of Figures 1-9, in that the base 20 is adapted to replace the cowl section of the garnish molding, and is provided with means constructed in like fashion to permit extension and retraction of a part (25B) of the base whereby the assembly may be made to extend for the required distance along the side of the cowl, regardless of the variations in cowl length incident to different makes and models of cars. Parts corresponding to those previously described have accordingly been dominated by like reference characters, distinguished by the addition of the letter B to each, and many features will be seen to require no detailed redescription.

The studs 33B, 43B are longer than the corresponding studs 33, 43 of the first described embodiment, and the curvature of the supporting arm 40B is modified in such manner that the base and arm may slope upwardly throughout their entire length, commencing at the cowl, as distinguished from the arrangement of the first embodiment in which the base section projects perpendicularly and the entire elevation of the mirror is accomplished by the upward curvature of the arm section 40.

The upward slope is imparted to the base and arm assembly by means of a filler block of suitable cross section, which may comprise a sheet metal element 75, bent to substantially right angular form and provided with a longitudinal slot 77 through which the studs 33B, 43B may extend. A corresponding sheet metal filler block 75' may be positioned under the retaining nuts 34B, 44B, upon the inner side of the cowl 14B. The filler block is normally concealed from view, since the underside of the assembly is below the eye level of most people under most conditions, but the lower face of the filler is nevertheless preferably so proportioned and finished as to meet smoothly and appear as an unbroken continuation of the base 20B. It will be evident that by reversing the filler blocks end-for-end with respect to the base, the latter may be made to slope upwardly in either direction, permitting the supporting assembly to be attached to either side of the car, and causing a pair of mirrors so installed upon opposite sides of a car to appear as symmetrical and complementary opposites of one another, so that they form an attractive pair, despite the fact that they are really identical rather than opposite in construction. In so providing for reverse installations, it is of course also necessary, normally, to loosen the screw 38B and turn the arm 40B with respect to the base 20B in such manner as to impart like but reverse longitudinal curvature of arms with respect to their bases.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

What I claim is:

1. Mounting means for attaching a rear view mirror or the like to an automobile body, comprising a base adapted to replace a section of garnish molding between the front door and the hood of the body, said base having an inner face including a portion adapted to bear against the vehicle body, holding means projecting from said inner face and arranged to extend through the side of the body, said base also having an outer face, an aperture extending through said base and opening at its one end in one of said faces and at its other end in the other face, a mirror supporting arm shaped to fit against the outer face and to project outwardly therefrom, fastening means extending through the aperture in the base and releasably securing the supporting arm to the base, said fastening means being accessible only from the inner face of said base when the latter is removed from the body, the abutting portions of said arm and base being concentric with respect to said fastening means, whereby said arm may be turned to any of a plurality of positions with respect to said base, and keying means for holding said arm against unwanted turning with respect to the base.

2. Mounting means for attaching a rear view mirror or the like to an automobile body, comprising a base adapted to replace a section of garnish molding between the front door and the hood of the body, an extension molding section carried by said base and projecting longitudinally therefrom, and means for securing said base and extension molding section with respect to the body, comprising a pair of holding elements carried by and movable longitudinally of the base and held against unwanted separation therefrom, said holding elements projecting from the bottom of the base in position to be shielded and rendered inaccessible by the base when the latter is secured upon the body, the holding elements being projectible through the body and securable from inside the same, at least one of said holding elements so interengaged with the base that when said holding element is tightly secured to the body the base and holding element are thereby clamped against relative movement.

3. An adjustable support for mounting a rear view mirror upon the side of an automobile body, comprising a base member adapted to replace a section of garnish molding between the front door and the hood of such an automobile body, an extension molding section housed in said base member and slidable to project therefrom in a manner to align with and appear as an extension of the garnish molding, and common means for securing said extension molding section against movement with relation to the base member and for securing the assembly of base member and extension section to the body, said securing means being shielded and rendered inaccessible by said member and extension section when so secured to the body.

4. An adjustable support for securing a rear view mirror upon the side of an automobile body, comprising a base adapted to replace a section of garnish molding between the front door and the hood of such an automobile body, an extension molding section housed in said base and slidable to project therefrom in a manner to align with and appear as an extension of the garnish molding, means for securing said extension molding section against movement with relation to the base member, and means for securing the base and extension section to the body, comprising a holding member longitudinally movable with respect to the base and extension section but held against separation therefrom, and projecting from the bottom of the base in position to be shielded and rendered inaccessible thereby, said holding member being adapted to project through the body and to be held by securing means applied to said holding member inside the body.

5. An adjustable support for a rear view mirror or the like comprising a base adapted to replace a section of garnish molding such as is commonly applied to the side of the cowl of a motor vehicle, said base being shorter than the garnish molding to be replaced, an extension garnish section adapted to interfit with said base and to project to greater or less extent therefrom to compensate for the difference between the length of the base and the length of the replaced garnish molding section, and means for securing said base and extension garnish section to the cowl and for securing said base and extension section against movement with relation to each other.

6. Means as set forth in claim 5 in which said securing means comprises a pair of holding elements projecting inwardly from said base and extension section and adapted to project through apertures in the side of the cowl, said holding elements being movable longitudinally of the base and extension section independently of each other and of said extension section.

7. Means as set forth in claim 5 including longitudinally extending slideway portions formed in said extension garnish section and in said base, said securing means comprising holding elements slidably retained in said slideway portions and projecting inwardly therefrom and adapted to project through an aperture in the side of the cowl.

8. An adjustable support for a rear view mirror or the like comprising a base portion adapted to be secured to a motor vehicle and to project outwardly from the side thereof, said base portion having an inner face adapted to lie against the side of the vehicle and having an outer face, the general plane of said outer face being substantially perpendicular to the direction of projection of said base portion, a supporting arm adapted to be secured to said base portion and to project outwardly from the outer face thereof, and means for securing the arm to the base portion in any of a plurality of positions of rotary adjustment, said securing means being arranged within the base portion and the arm and accessible only from the inner face of the base portion.

9. An adjustable support for a rear view mirror or the like comprising a base having an inner face and adapted to be secured to and project from the side of a motor vehicle, a mirror supporting arm adapted to be secured to the outer end of said base and to project outwardly therefrom as a continuation thereof, said base and arm having interconnectible coupling portions concentric with respect to one another, the outer surfaces of said arm and base adjacent the point of juncture of said coupling portions also being concentric with respect to one another and with respect to said coupling portions, and being adapted to abut one another in such manner as to appear continuous, fastening means extending through an interior portion of the base and accessible only from the inner face thereof, for releasably securing said coupling portions together to fasten the arm to the base, and to hold the arm against turning, the arm being rotatable with respect to the base when said fastening means is released.

10. Mounting means for attaching a rear view mirror or the like to an automobile body, comprising a base adapted to replace a section of garnish molding between the front door and the hood of the body, said base having an inner face including a portion adapted to bear against the vehicle body, holding means projecting from said inner face and arranged to extend through the side of the body, said base also having an outer face, an aperture extending through said base and opening at its one end in one of said faces and at its other end in the other face, a mirror supporting arm shaped to fit against the outer face and to project outwardly therefrom, fastening means extending through the aperture in the base and releasably securing the supporting arm to the base, and holding said arm against unwanted turning with relation to the base, said fastening means being accessible only from the inner face of said base when the latter is removed from the body, the abutting portions of said arm and base being concentric with respect to said fastening means, whereby said arm may be turned to any of a plurality of positions with respect to said base.

CHARLES E. MORLEY.